Patented July 21, 1936

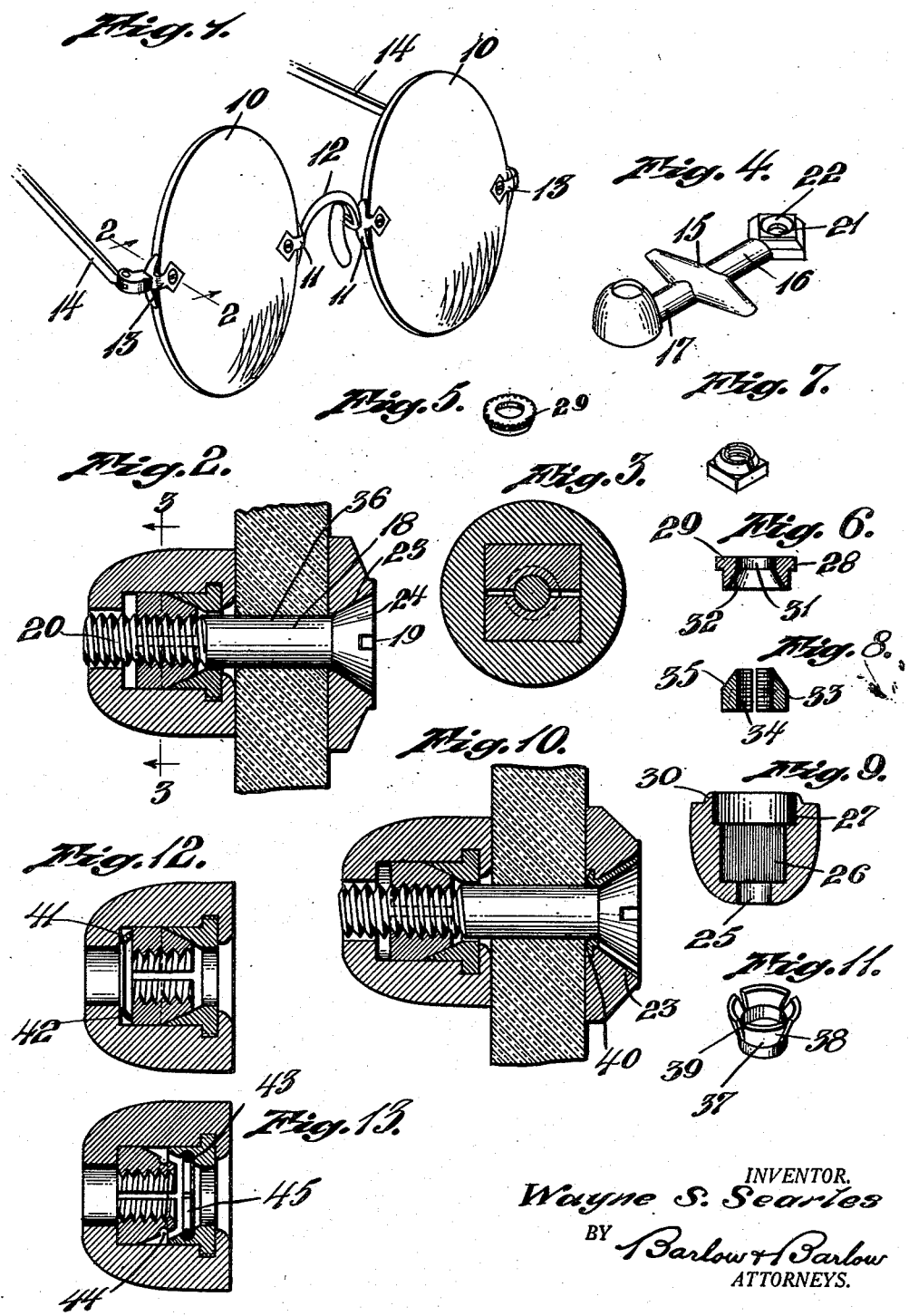

2,048,298

UNITED STATES PATENT OFFICE 2,048,298

OPHTHALMIC MOUNTING

Wayne S. Searles, Providence, R. I., assignor to Universal Optical Corporation, Providence, R. I., a corporation of Rhode Island Application November 20, 1934, Serial No. 753,914

13 Claims. (Cl. 88—47)

This invention relates to an ophthalmic mounting, and has for one of its objects the securing of a strap such as used on rimless lenses in such a manner that the fastening means will not come loose while in use.

Another object of the invention is the provision of means for fastening the screw that extends through the lens and also through the strap arms so that it will not come loose in use and yet may be mechanically removed from its position without resorting to heat such as is used for soldering the screw in place.

Another object of the invention is the provision of fastening means which may be tightened up in such a manner that a secure engagement of the parts may be had without danger of cracking the lens by too tight a drawing together of the arms extending along either surface thereof.

Another object of the invention is the provision of means by which the nut or threaded bushing which is pre-bored may be aligned for the reception of the screw by the use of a tap or the like without enlarging the threads in the receiving bushing, such as so frequently occurs to cause looseness between the bushing and the screw which is placed therein.

Another object of the invention is the provision of screw securing means which will be completely housed in one of the arms without enlarging the arm to an unsightly extent.

Another object of the invention is the forming of the threaded bushing in a plurality of separate parts which will be held in substantially aligned position and will be contracted by axial movement thereof caused by the screw.

A further object of the invention is the provision of a fastener which will accommodate screws of varying sizes.

With these and other objects in view, the invention consists of certain novel features of construction, as will be more fully described, and particularly pointed out in the appended claims.

In the accompanying drawing:

Fig. 1 is a perspective view of a rimless spectacle with my improved straps applied thereto;

Fig. 2 is a section on line 2—2 of Figure 1;

Fig. 3 is a section on line 3—3 of Figure 2;

Fig. 4 is a perspective view of one of the straps in unfolded position;

Fig. 5 is a perspective view of a sleeve which forms part of my fastening means;

Fig. 6 is a sectional view of the sleeve;

Fig. 7 is a perspective view of my threaded locking bushing after threading, but before severing the sections;

Fig. 8 is a sectional view of the bushing showing the separate parts thereof;

Fig. 9 is a sectional view through one of the arms of the strap before the locking parts are inserted;

Fig. 10 is a sectional view similar to Figure 2 of a modified construction;

Fig. 11 is a perspective view of the resilient locking collar beneath the head shown in Figure 10;

Fig. 12 is a sectional view of one of the arms showing a different modified arrangement;

Fig. 13 is a sectional view of a still different modified arrangement.

In the use of lens straps on rimless lenses, it is usual for the optician after he has bent the strap to the desired position, to run a tap through the screw holes to align the threads so that the screw will be properly received in the strap. By running a tap into the threaded portion which is to receive the screw even though the parts are accurately aligned, the threaded opening is enlarged slightly so that the screw does not fit as tightly as it otherwise would, and in order to prevent such enlarging of the thread hole when the tap is passed through it, I have formed a threaded bushing in several parts so that when the tap is run through, these parts merely expand slightly and are not cut by the tap. The parts are tapered at one end with a flaring opening to receive them so that as the screw is turned into the threaded bushing, these parts will be contracted to bring the threads tightly into engagement with the threads of the screw and bind the parts in position, and in this way I form a more secure fastening by reason of preventing wear or a cutting action of the tap upon the threads which receive the screw; and the following is a more detailed description of the present embodiment of this invention, illustrating the preferred means by which these advantageous results may be accomplished:

With reference to the drawing, 10 designates the lenses of a spectacle of the rimless type to which there are secured straps 11, at the inner edges for mounting the bridge 12, while the outer edges are provided with straps 13 to mount the temples 14. The structure by which the straps are mounted upon the lenses is more particularly the subject matter to which this invention relates.

Each of the straps 11 and 13 is of substantially identical construction and consists of a body portion 15 with a front arm 16 and a rear arm 17. These arms extend along the opposite surfaces of the lenses and in addition to receiving between them the lenses, if desired a spring may be positioned between the arms to engage the edge of the lens and apply a pressure upon the lens allowing a limited rocking movement about a screw designated generally 18. This screw is threaded at one end 20 and headed at its other end 19 with an inclined under surface to fit into countersink 22 of the opening 21 provided in the arm 16.

The rear arm 17 is of somewhat bullet shape on its outer surface, and is initially provided with bores of varying sizes, see Figure 9, there being a small bore 25 to receive the screw, a larger square bore 26 to receive the bushing, and a still larger bore 27 to receive the knurled edge flange 28 of a rigid sleeve designated generally 29, while the inner portion 30 of the enlarged end of the arm 17 is rolled over the flange 28 of this sleeve to secure it fixedly in position. The sleeve 29 is provided with an opening 31 of a size to allow the threaded screw to freely pass therethrough and is flared outwardly as at 32, clearly shown in Figure 6.

The bushing designated generally 33 is formed in a plurality of parts, I having shown two for illustrative purposes. The bushing is first formed as shown in Figure 7, split along the taper only, is then threaded as at 34, and then the parts are completely severed. The bushing is square and is of a size to more or less loosely fit within the square bore 26 of the arm 17, while it is tapered as at 35 on an angle to fit the flare 32 of the sleeve so that as the bushing moves axially of the opening in the arm 17, it will be contracted.

In operation when the arms are in position and their openings aligned with the opening 36 in the lens, a tap may be placed through these openings and the free sections of the bushing 33 will expand so that the tap will not cut them. The screw will then be placed in the opening and upon rotation will cause the section of the bushing to be drawn tightly into engagement with the sleeve so that the flared surface 32 engaging the taper 35 will contract the bushing, whereupon the bushing will tightly bind the screw and hold it securely in position.

In some instances, I may desire to place a resilient collar 37 having a flared head 38 split as at 39 beneath the head of the screw and lock it in the arm 16 in the recess 40 provided therefor, the taper of the split collar 38 being different than the taper 23 so that its resiliency will be exerted upon the head tending to move it out of its opening in the arms. In this manner, there will be a tendency for the split section of the bushing to be drawn into engagement with the flaring surface of the sleeve to at all times exert a tension upon these parts and cause them to remain in frictional engagement and assist in preventing the screw from being retracted from its opening.

In the form which I have illustrated in Figure 12, I have provided a resilient collar 41 between the shoulder 42 of the bores 25 and 26 so as to act upon the end of the bushing and move it axially into engagement with the tapered surface of the sleeve 29; this tending at all times to cause a contraction of the sections of the bushing. The spring is sufficiently weak to permit expansion of the sections of the bushing and prevent a tap or the like from engaging the threads with sufficient force or pressure to exert any cutting action thereon.

In Figure 13, I have illustrated a recess 43 in the sleeve, and a recess 44 in the sections in the bushing, while I have provided a spring ring 45 which may contract or expand and is of sufficient size to enter and engage both recesses and form a lock for holding the sleeve member and the bushing member firmly in engagement after such engagement has been established by reason of pulling the members together by the screw.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a lens strap having a pair of arms along opposite sides of the lens and provided with openings registering with each other and with the opening in the lens, a sleeve of a material harder than said arm fixed in one of said openings and provided with an internal outwardly flaring surface, an internally threaded bushing having a portion guided by the side walls of said opening and another portion at one end to fit the flaring surface of said sleeve and axially movable in said opening and a screw extending through said openings and engaging said bushing to axially move it into engagement with said sleeve.

2. In an ophthalmic mounting, a lens strap having a pair of arms along opposite sides of the lens and provided with openings registering with each other and with the opening in the lens, a sleeve of a material harder than said arm fixed in one of said openings and provided with an internal outwardly flaring surface, an internally threaded bushing having a portion guided by the side walls of said opening and another portion at one end tapered to fit the flaring surface of said sleeve and split to provide a plurality of separate portions and axially movable in said opening, and a screw extending through said openings and engaging said bushing to axially move it into engagement with said sleeve to contract said portions of said bushing to tightly engage and grip said screw, said sleeve having a projection extending into a recess in the opening in which the sleeve is fixed and the material of the arm containing such opening having gripping relation with said projection.

3. In an ophthalmic mounting, a lens strap having a pair of arms along opposite sides of the lens and provided with openings registering with each other and with the opening in the lens, a screw extending through said openings, a pair of members in the opening in one of said arms having interfitting surfaces tending to contract one of the members when moved axially, one of said members having a knurled flange fitting in a recess in said opening in which it lodges, and the other member being movable with reference thereto.

4. In an ophthalmic mounting, a lens strap having a pair of arms along opposite sides of the lens and provided with openings registering with each other and with the opening in the lens, a screw extending through said openings, a pair of members in the opening in one of said arms having interfitting surfaces tending to contract one of the members when moved axially, one of said members having a knurled flange fitting in a recess in said opening in which it lodges, and the other member being movable axially of said opening with reference thereto.

5. In an ophthalmic mounting, a lens strap having a pair of arms along opposite sides of the lens and provided with openings registering with each other and with the opening in the lens, a screw extending through said openings, a pair of members in the opening in one of said arms having interfitting surfaces tending to contract one of the members when moved axially, and resilient means tending to move one of said members axially.

6. In an ophthalmic mounting, a lens strap having a pair of arms along opposite sides of the lens and provided with openings registering with each other and with the opening in the lens, a pair of members of a material harder than said arm in one of said openings, one being threaded and split, a screw through said openings to engage said threaded member for moving it axially into engagement with said other member, the engaging surfaces of said members being shaped to interfit one with the other and contract the threaded member upon axial movement, and resilient means engaging said threaded member and tending to move it toward the other member.

7. In an ophthalmic mounting, a lens strap having a pair of arms along opposite sides of the lens and provided with openings registering with each other and with the opening in the lens, a pair of members of a material harder than said arm in one of said openings, one being threaded and split, a screw through said openings to engage said threaded member for moving it axially into engagement with said other member, the engaging surfaces of said members being shaped to interfit one with the other and contract the threaded member upon axial movement, and resilient means engaging said threaded member and tending to move it toward the other member, said other member having a flange fitting in a recess in the opening in said arm to prevent it from moving.

8. In an ophthalmic mounting, a lens strap having a pair of arms along opposite sides of the lens and provided with openings registering with each other and with the opening in the lens, a pair of members of a material harder than said arm in one of said openings, one being threaded, a screw through said openings to engage said threaded member for moving it axially into engagement with said other member, said threaded member being split to permit contraction and expansion and tapered on its end, said other member being rigid and flared to receive said tapered end, and resilient means engaging said threaded member and tending to move it toward the other member.

9. In an ophthalmic mounting, a lens strap having a pair of arms along opposite sides of the lens and provided with openings registering with each other and with the opening in the lens, a pair of members of a material harder than said arm in one of said openings, one being threaded, a screw through said openings to engage said threaded member for moving it axially into engagement with said other member, said threaded member being split to permit contraction and expansion and tapered on its end, said other member being rigid and flared to receive said tapered end and having a flange fitting in a recess in the opening in said arm to prevent it from moving.

10. In an ophthalmic mounting, a lens strap having a pair of arms along opposite sides of the lens and provided with openings registering with each other and with the opening in the lens, a pair of members of a material harder than said arm in one of said openings, one being threaded, a screw through said openings to engage said threaded member for moving it axially into engagement with said other member, said threaded member being split to permit contraction and expansion and tapered on its end, said other member being rigid and flared to receive said tapered end, and resilient means engaging said threaded member and tending to move it toward the other member, said other member having a flange fitting in a recess in the opening in said arm to prevent it from moving.

11. In an ophthalmic mounting, a lens strap having a pair of arms along opposite sides of the lens and provided with openings registering with each other and with the opening in the lens, a screw extending through said openings, a pair of members, one member being threaded in the opening in one of said arms having interfitting surfaces tending to contract one of the members when moved axially, and resilient means tending to move said screw and said threaded member axially.

12. In an ophthalmic mounting, a lens strap having a pair of arms along opposite sides of the lens and provided with openings registering with each other and with the opening in the lens, a screw extending through said openings, a pair of members in the opening in one of said arms having interfitting surfaces tending to contract one of the members when moved axially, and means for locking said interfitting surfaces when in engagement.

13. In an ophthalmic mounting, a lens strap having a pair of arms along opposite sides of the lens and provided with openings registering with each other and with the opening in the lens, a screw extending through said openings, a pair of members in the opening in one of said arms having interfitting surfaces tending to contract one of the members when moved axially, said interfitting surfaces being provided with recesses and an expansible and contractible ring located partially in both of said surfaces.

WAYNE S. SEARLES.